US012694905B1

(12) United States Patent
Dides

(10) Patent No.: US 12,694,905 B1
(45) Date of Patent: Jul. 28, 2026

(54) CONTEXTUAL DIALOGUE REPLACEMENT

(71) Applicant: eBay Inc., San Jose, CA (US)

(72) Inventor: Emil Dides, Coppell, TX (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 19/087,927

(22) Filed: Mar. 24, 2025

(51) Int. Cl.
| | |
|---|---|
| *G11B 27/031* | (2006.01) |
| *G06F 40/58* | (2020.01) |
| *G06V 20/40* | (2022.01) |
| *G06V 40/16* | (2022.01) |
| *G10L 13/027* | (2013.01) |
| *G10L 13/033* | (2013.01) |
| *G10L 15/18* | (2013.01) |
| *G10L 21/055* | (2013.01) |

(Continued)

(52) U.S. Cl.
CPC ............ *G11B 27/031* (2013.01); *G06F 40/58* (2020.01); *G06V 20/41* (2022.01); *G06V 20/46* (2022.01); *G06V 40/174* (2022.01); *G10L 13/027* (2013.01); *G10L 13/0335* (2013.01); *G10L 15/1815* (2013.01); *G10L 21/055* (2013.01); *G10L 25/57* (2013.01); *G10L 25/63* (2013.01)

(58) Field of Classification Search
CPC ....... G11B 27/031; G06F 40/58; G06V 20/41; G06V 20/46; G06V 40/174; G10L 13/027; G10L 13/0335; G10L 15/1815; G10L 21/055; G10L 25/57; G10L 25/63
USPC ....................................................... 386/282
See application file for complete search history.

(56) References Cited

U.S. PATENT DOCUMENTS

| | | | |
|---|---|---|---|
| 9,922,665 | B2 | 3/2018 | Matthews et al. |
| 11,514,948 | B1 | 11/2022 | Nair et al. |

(Continued)

FOREIGN PATENT DOCUMENTS

| | | |
|---|---|---|
| CN | 111564164 | 8/2020 |
| WO | 2022110354 | 6/2022 |

OTHER PUBLICATIONS

Caschera, Maria Chiara, "Emotion Classification from Speech and Text in Videos Using a Multimodal Approach", Multimodal Technologies and Interaction, Apr. 12, 2022, 23 pgs.

(Continued)

*Primary Examiner* — Loi H Tran
(74) *Attorney, Agent, or Firm* — Shook Hardy & Bacon L.L.P.

(57) ABSTRACT

Methods, systems, and computer programs are presented for replacing dialogue in a video segment. One method includes operations for analyzing content of a video to extract dialogue and meaning in the video, and for determining fragments of the video to be modified based on the extracted dialogue and meaning. The modification is based on factors comprising regional differences, cultural sensitivity, and inappropriate content. For each fragment to be modified, the following operations are performed: generate replacement speech based on the regional differences, cultural sensitivity, and inappropriate content; and generate audio for the replacement speech. The generation of the audio comprises synchronizing the audio with the video to align audio with lip movements while maintaining an emotional tone and a voice profile of each speaker in the video. Further, the method includes an operation for causing presentation on a computer display of the video with the modified one or more fragments.

20 Claims, 6 Drawing Sheets

(51) Int. Cl.
    *G10L 25/57*         (2013.01)
    *G10L 25/63*         (2013.01)

(56)                References Cited

U.S. PATENT DOCUMENTS

| | | | |
|---|---|---|---|
| 2020/0219489 A1* | 7/2020 | Stephenson | G06F 40/232 |
| 2021/0352380 A1 | 11/2021 | Duncan et al. | |
| 2023/0039248 A1 | 2/2023 | Mccartney | |
| 2023/0402033 A1* | 12/2023 | Heinzmann | G10L 15/22 |
| 2024/0430497 A1 | 12/2024 | Su et al. | |
| 2025/0008186 A1* | 1/2025 | Couleaud | H04N 21/4665 |

OTHER PUBLICATIONS

Oskooei, Amirkia Rafiei, "Seeing the Sound Multilingual Lip Sync for Real Time Face to Face Translation", MDPI Computers, Dec. 28, 2024, 27 pgs.

* cited by examiner

200

206

202

204

USER DEVICE(S)

CLIENT APPLICATION

NETWORK

228

EXTERNAL SYSTEM(S)

208

NETWORK SYSTEM

210    API SERVER(S)

212    WEB SERVER(S)

216

APPLICATION SERVER(S)

222    PUBLICATION SYSTEM

224    REVIEW SYSTEM

226    MESSAGING SYSTEM

220

218    DATABASE SERVER(S)

DATABASE(S)

300

IDENTIFY DIALOGUE AND EXTRACT MEANING — 302

DETERMINE SEMANTIC MEANING OF DIALOGUE — 304

IDENTIFY DIALOGUE TO BE MODIFIED — 306

GENERATE NEW SPEECH FOR THE DIALOGUE IDENTIFIED TO BE MODIFIED — 308

MULTILINGUAL VOICE SYNTHESIS — 310

PROVIDE UI AND API TO ENABLE USER ADJUSTMENTS AND CONFIGURATION — 312

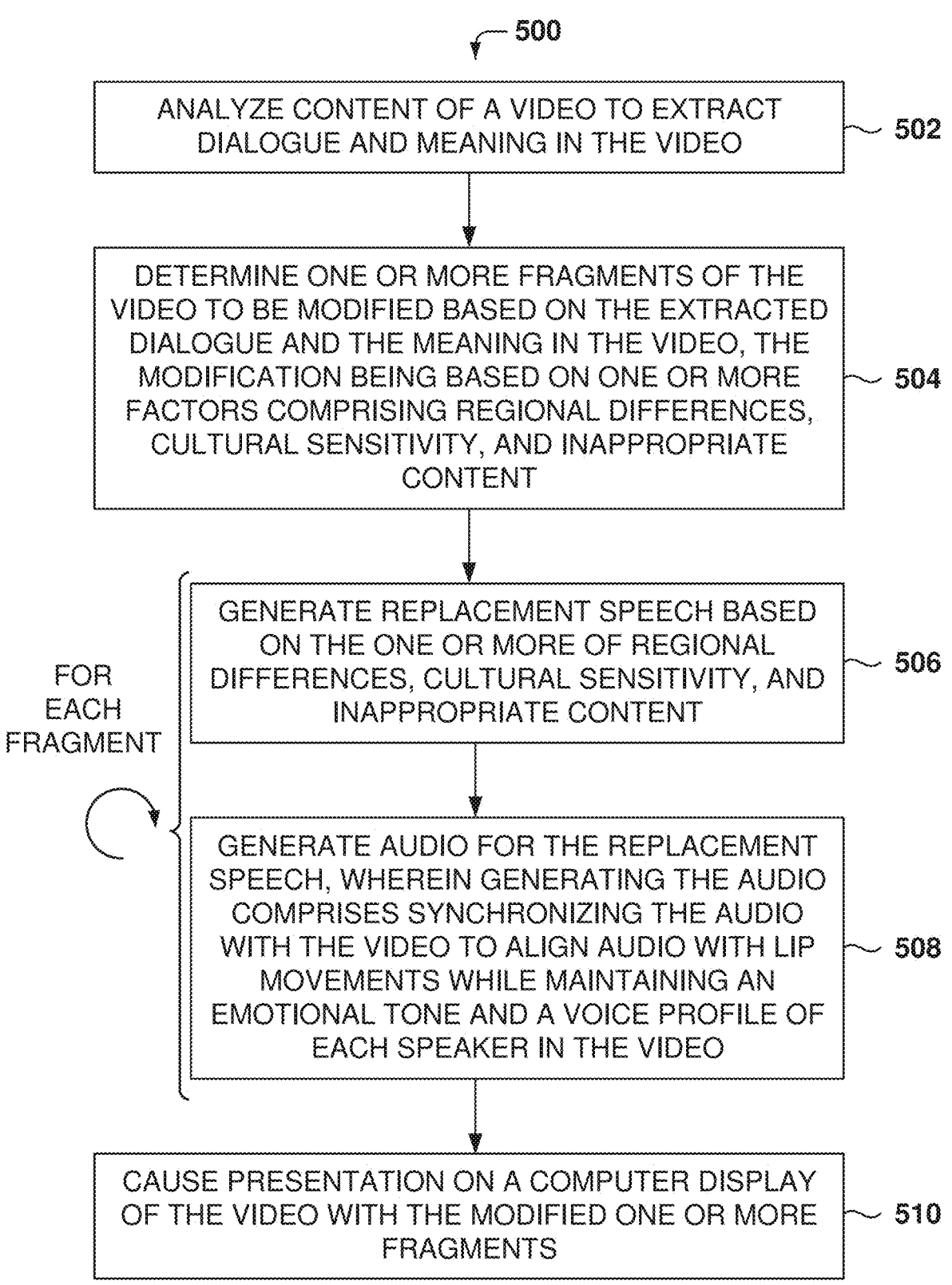

500

ANALYZE CONTENT OF A VIDEO TO EXTRACT DIALOGUE AND MEANING IN THE VIDEO — 502

DETERMINE ONE OR MORE FRAGMENTS OF THE VIDEO TO BE MODIFIED BASED ON THE EXTRACTED DIALOGUE AND THE MEANING IN THE VIDEO, THE MODIFICATION BEING BASED ON ONE OR MORE FACTORS COMPRISING REGIONAL DIFFERENCES, CULTURAL SENSITIVITY, AND INAPPROPRIATE CONTENT — 504

GENERATE REPLACEMENT SPEECH BASED ON THE ONE OR MORE OF REGIONAL DIFFERENCES, CULTURAL SENSITIVITY, AND INAPPROPRIATE CONTENT — 506

FOR EACH FRAGMENT

GENERATE AUDIO FOR THE REPLACEMENT SPEECH, WHEREIN GENERATING THE AUDIO COMPRISES SYNCHRONIZING THE AUDIO WITH THE VIDEO TO ALIGN AUDIO WITH LIP MOVEMENTS WHILE MAINTAINING AN EMOTIONAL TONE AND A VOICE PROFILE OF EACH SPEAKER IN THE VIDEO — 508

CAUSE PRESENTATION ON A COMPUTER DISPLAY OF THE VIDEO WITH THE MODIFIED ONE OR MORE FRAGMENTS — 510

FIG. 5

CONTEXTUAL DIALOGUE REPLACEMENT

TECHNICAL FIELD

The subject matter disclosed herein generally relates to methods, systems, and machine-readable storage media for analyzing and editing speech in a video segment.

BACKGROUND

Modifying video content to ensure accurate subtitles, voiceovers, and translations is a labor-intensive process that is not fully automated, leading to inefficiencies and increased costs. Specific symptoms of the problem include the need to hire voice actors and subtitle editors to ensure that video content is accurately dubbed and subtitled in various languages. An example scenario highlighting the problem is the re-editing of older movies, where new voiceovers are added to match the original actors' voices.

The problem occurs in environments where video content is produced and distributed, such as streaming services and video conferencing platforms. The problem arises because of the need for accurate synchronization of dialogue with lip movements and the preservation of emotional tone across different languages. The impact of the problem can be significant and costly, as it affects the efficiency of video production processes and increases operational costs. Failure to address the problem can result in inaccurate translations, misaligned voiceovers, and cultural insensitivity in video content.

Potential causes of the problem include the lack of advanced automation tools capable of accurately analyzing and modifying video content. Existing solutions have attempted to automate parts of the process, such as subtitle generation, but these are not fully effective. Some work-arounds involve manual intervention to correct errors in automated outputs. However, these are only partially successful and do not address the root cause of the inefficiencies in the video content modification process.

BRIEF DESCRIPTION OF THE DRAWINGS

Various appended drawings illustrate examples of the present disclosure and cannot be considered limiting its scope.

FIG. 5 is a flowchart of a method for replacing dialogue in a video segment based on configurable parameters, according to some examples.

DETAILED DESCRIPTION

Figure 1:
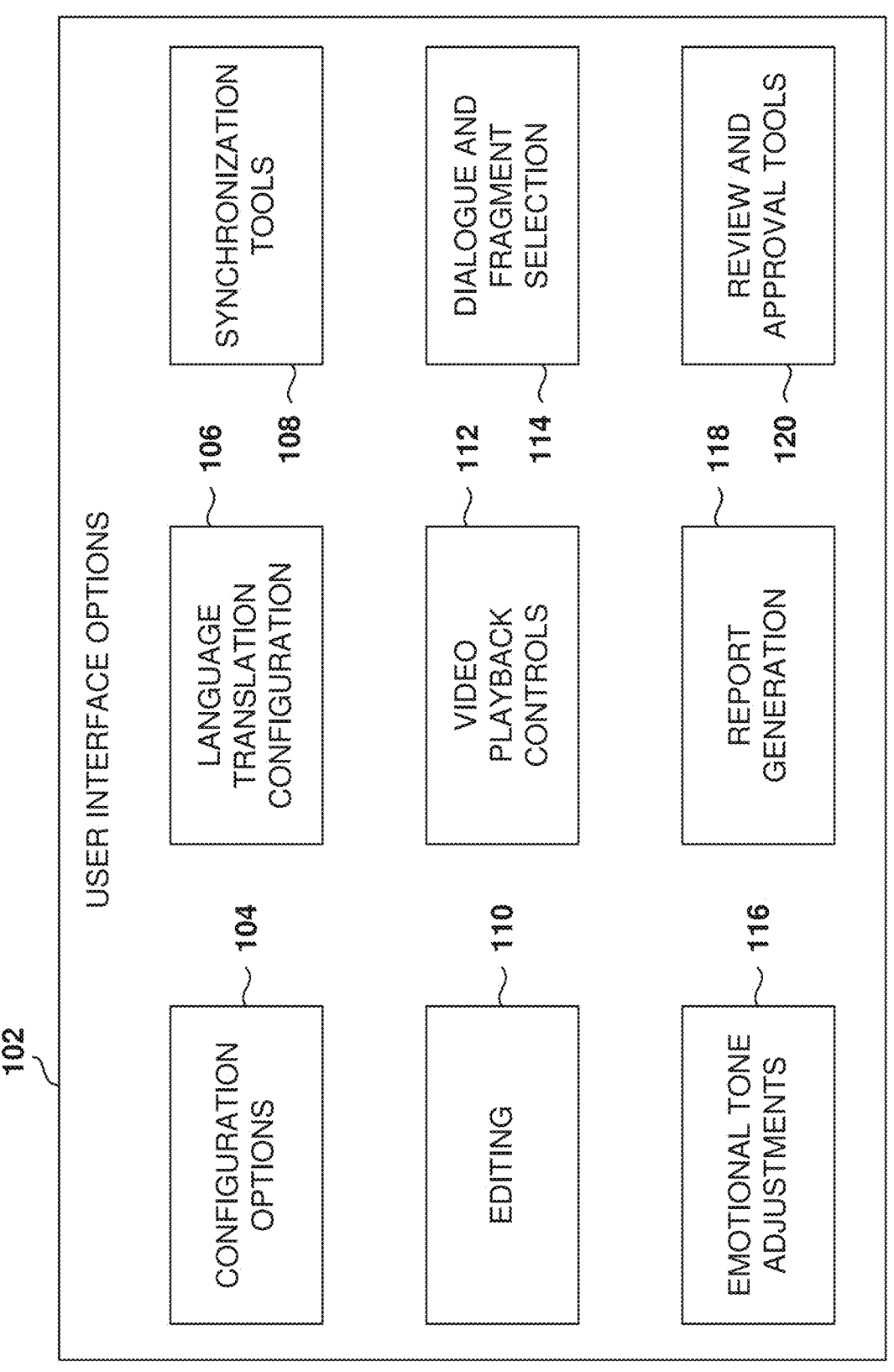
FIG. 1 shows user interface options for contextual dialogue replacement, according to some examples.

Example methods, systems, and computer programs described herein are directed at replacing dialogue in a video segment based on configurable parameters. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

A Contextual Dialogue Replacement System (CDRS) is presented. The CDRS analyzes video content, identifies dialogues that need to be altered and uses Artificial Intelligence (AI)-driven models for speech synthesis, emotional adaptation, and multilingual processing. The CDRS ensures a seamless integration of new dialogue into video while keeping the speaker's voice and emotional tone intact, all with real-time synchronization of audio and video. The CDRS provides user-controlled adjustments and operates with minimal latency.

The solution described herein relates to modifying video content using AI. The process begins with analyzing video content to extract dialogue and meaning. This analysis employs deep learning models, such as convolutional neural networks (CNNs) for visual cues and recurrent neural networks (RNNs) for speech patterns. The extracted dialogue is further processed to determine the emotional tone and context. In some examples, this processing involves natural language processing models, including sentiment analysis and emotion detection, to identify cultural and regional sensitivities.

Once the dialogue and context are understood, the process identifies fragments of the video that require modification. Modifications are based on factors such as regional differences, cultural sensitivity, and inappropriate content. For each identified fragment, the method generates replacement speech. In some examples, the speech is synchronized with the video using dynamic time warping to align with lip movements. The synchronization maintains the emotional tone and voice profile of each speaker.

The process also includes translating the dialogue into multiple languages upon request. This translation preserves the original emotional tone and context, utilizing a multilingual language processing module.

Additionally, a user interface is provided. This interface allows human operators to review and adjust the AI-generated outputs and configure parameters. For example, operators can make real-time modifications and approve the final presentation of the modified video content.

One benefit of this solution is the automation of video content modification, which reduces the need for manual intervention in tasks such as dubbing and subtitling. This can lead to cost savings and increased efficiency in video production and distribution. The solution is applicable to various scenarios, including streaming services and video conferencing, where content needs to be adapted for different audiences or contexts.

Additionally, replacing audio dialogue in a video using AI to generate the speech of a character enhances current voice replacement technology by leveraging advanced machine learning models and algorithms. This approach utilizes neural voice cloning techniques to replicate the unique vocal attributes of the original speaker, including pitch, tone, and cadence. The CDRS can produce high-quality, human-like speech that closely matches the original voice profile.

Further, the CDRS multilingual capabilities enable seamless translation of dialogue into different languages while preserving the emotional tone and voice profile. This is achieved through multilingual neural networks and text-tospeech (TTS) technology, allowing for efficient localization of video content without the need for separate models for each language.

The method of preserving the original emotional tone and context in voice technology improves current systems by utilizing advanced AI models that can accurately capture and replicate the nuanced emotional expressions of the original speaker. This approach involves analyzing the dialogue to determine its emotional tone using sentiment analysis and emotion detection techniques. By maintaining the emotional tone, the CDRS ensures that the replacement speech conveys the same feelings and intentions as the original dialogue, which is important for maintaining the authenticity and impact of the content.

The method of synchronizing speech with video using dynamic time warping (DTW) to align with lip movements represents an improvement over current technologies by providing a more precise and flexible approach to audio-visual synchronization. DTW is an algorithm that measures the similarity between two temporal sequences, even if they are not perfectly aligned in time. This capability is particularly valuable when dealing with sequences that exhibit temporal distortions or vary in speed. Further, DTW allows for the non-linear warping of the time axis, enabling segments of the audio sequence to be stretched or compressed to optimally align with the corresponding video segments. This ensures that the replacement speech matches the lip movements of the characters in the video, maintaining the visual coherence and authenticity of the content.

Current technologies often rely on linear synchronization methods, which may not account for variations in speech tempo or the natural fluctuations in dialogue delivery. DTW, on the other hand, constructs a cost matrix to determine the best alignment path through dynamic programming, minimizing the cumulative distance between the audio and video sequences. This results in a more accurate and seamless integration of new dialogue into existing video content.

The implementation of multi-task learning to train a universal speech synthesis model that performs both translation and voice synthesis without needing separate models for each language is an improvement over existing technologies due to its efficiency and scalability. Multi-task learning allows a single model to simultaneously learn multiple tasks, such as translation and voice synthesis, by sharing representations and parameters across tasks. This approach reduces the complexity and resource requirements associated with maintaining separate models for each language. By leveraging multi-task learning, the universal speech synthesis model can efficiently handle multiple languages, preserving the original speaker's emotional tone and voice profile across translations.

Existing technologies often require distinct models for each language, leading to increased computational overhead and maintenance challenges. The universal model streamlines the process by utilizing shared learning, which enhances the model's ability to generalize across languages and adapt to new linguistic contexts with minimal additional training.

Some of the concepts used for the description of the solution are presented below.

A deep learning model is a type of artificial intelligence architecture that utilizes multiple layers of interconnected nodes, or neurons, to process and analyze complex data patterns. These models are designed to automatically learn and improve from experience without being explicitly programmed, using large datasets to identify patterns and make predictions. The deep learning models may include Convolutional Neural Networks (CNNs), Recurrent Neural Networks (RNNs), Long Short-Term Memory (LSTM), transformer models, and Natural Language Processing (NLP).

A Convolutional Neural Network (CNN) is a class of deep learning models primarily used for analyzing visual data. The CNN applies filters to image data and is suitable for tasks like object detection and image segmentation.

A Recurrent Neural Network (RNN) is a class of neural networks designed for sequential data that are well-suited for tasks where previous inputs influence the current output, such as speech recognition or time-series analysis.

A Long Short-Term Memory (LSTM) is a type of RNN designed to address the issue of vanishing gradients, allowing models to retain long-term dependencies. This improves the understanding of context in long video sequences.

A Transformer model (e.g., BERT, GPT-3, T5) is a machine-learning model that excels in understanding relationships within sequential data by considering the entire sequence of inputs at once, particularly effective in natural language processing tasks such as semantic understanding and dialogue generation.

Natural Language Processing (NLP) is a branch of AI focused on the interaction between computers and human language, including tasks like sentiment analysis, semantic parsing, and translation.

Automatic Speech Recognition (ASR) is a technique that converts spoken language into text, enabling the CDRS to identify and extract dialogue from audio tracks in video content.

Text-to-speech (TTS) technology converts written text into spoken words using synthetic speech generation. TTS involves the use of algorithms and models to produce human-like speech from text input. Some examples of TTS include WaveNet, FastSpeech 2, HiFi-GAN, and voice cloning.

WaveNet is a deep learning model developed by Google DeepMind to generate high-quality human speech. WaveNet works by modeling the waveform of speech directly and is known for producing more natural-sounding speech.

FastSpeech 2 is a non-autoregressive version of TTS that enables faster and scalable voice synthesis, ideal for real-time applications.

HiFi-GAN is a neural vocoder used to generate high-quality speech synthesis from spectrograms. It's optimized for real-time use, making it suitable for seamless dialogue replacement.

Voice cloning is a technique that uses deep learning models to replicate the voice of a specific individual by learning their unique pitch, tone, cadence, and speech patterns.

Neural voice cloning is a process that leverages AI to create a model of a specific person's voice. The cloned voice can then be used to generate new speech that sounds as if it were spoken by the original person.

Emotion-aware content adaptation is the CDRS's ability to detect the emotional tone of speech (e.g., anger, joy, sadness) and adjust the dialogue replacement accordingly to preserve the emotional context of the original content.

Dynamic Time Warping (DTW) is a technique for adjusting and synchronizing the timing of speech and video elements, ensuring that the speech matches the lip movements in the video, even if the speech has been modified or replaced.

A Lip-syncing algorithm adjusts the movement of characters' lips in a video to ensure that the lip movement matches the timing and phonetics of the newly generated speech.

A Multilingual neural network is an AI model designed to understand and generate multiple languages.

Serverless computing (e.g., AWS Lambda) is a cloud computing model that runs code in response to events and automatically manages the compute resources.

Multi-cloud orchestration is the process of coordinating multiple cloud computing platforms to ensure the high availability, scalability, and efficiency of a system. This is important for ensuring real-time performance across different regions of the world.

A dialogue is the spoken content within a video, which includes the words and sentences exchanged between characters or speakers.

A fragment is a portion of the video identified for modification based on specific criteria such as regional differences, cultural sensitivity, or inappropriate content.

Multilingual voice synthesis is a process that involves generating speech in multiple languages while maintaining the original speaker's emotional tone and voice profile.

Replacement speech is newly generated audio content that substitutes the original dialogue in a video, tailored to meet specific modification criteria.

A semantic meaning is the contextual and emotional interpretation of dialogue, determined through natural language processing techniques.

Synchronization is the alignment of audio with video, ensuring that the timing of speech matches lip movements and facial expressions.

A voice profile is a set of characteristics that define a speaker's unique vocal attributes, including pitch, tone, and cadence, used to generate replacement speech that closely matches the original speaker.

FIG. 1 shows user interface options 102 for contextual dialogue replacement, according to some examples. The process of making subtitles for a video is usually performed manually by a specialist, which is costly. Additionally, translating speech and subtitles requires hiring actors and translators, which also requires an additional expense.

The techniques described herein allow for the automatic generation of subtitles and translations of video segments. Additionally, techniques are provided to detect and change content that may be inappropriate, such as obscene or insensitive language inappropriate for specific audiences.

The techniques may be used for off-line work, e.g., to process a movie, but also in real-time scenarios, such as during a speech at a conference or in a video conference with other participants.

The user interface options 102 provide a comprehensive framework for interacting with the video editing system. Configuration options 104 enable the adjustment of parameters such as regional differences, cultural sensitivity, and inappropriate content. These settings allow for the customization of video modifications based on specific requirements.

Language translation configuration 106 offers tools for selecting target languages and adjusting translation settings. This component ensures that the emotional tone and voice profile are maintained across different languages. Synchronization tools 108 are options for aligning audio with video, ensuring lip-sync accuracy. In some examples, facial recognition alignment settings are used to achieve precise synchronization. Additionally, options to manually adjust synchronization are provided.

Editing 110 provides functionalities for making real-time modifications to the AI-generated outputs. Users can manually edit or override AI decisions to refine the video content. Further, video playback controls 112 includes options for playing edited and unedited video, such as play, pause, rewind, and fast-forward. A timeline or progress bar is also provided to help the user navigate through the video.

Dialogue and fragment selection 114 allows users to identify and select specific fragments of the video for review or further editing. Visual markers on the timeline indicate the fragments identified for modification. Also, emotional tone adjustments 116 offer tools to categorize and adjust the emotional tone of the dialogue.

The categorization of emotional tones helps in identifying and replicating the emotional tone in voice synthesis applications, ensuring that the synthesized speech conveys the intended emotional expression accurately.

Some example of emotional categories include: joyful (e.g., excited, happy, cheerful), positive emotional states characterized by elevated pitch, faster speech rate, and lively intonation; sad (e.g., melancholic, sorrowful, disappointed), negative emotional states often marked by lower pitch, slower speech rate, and subdued intonation; angry (e.g., frustrated, irritated, enraged), intense emotional states with increased volume, faster speech rate, and sharp intonation; calm (e.g., relaxed, peaceful, serene), neutral or positive states with steady pitch, moderate speech rate, and smooth intonation; fearful (e.g., anxious, scared, nervous), negative emotional states characterized by higher pitch, faster speech rate, and tense intonation; surprised (e.g., astonished, shocked, amazed), positive or neutral states with varied pitch, sudden changes in speech rate, and dynamic intonation; confident (e.g., assured, assertive, bold), positive states with steady pitch, clear articulation, and strong intonation; and disgusted (e.g., repulsed, disdainful, contemptuous), negative states with lower pitch, slower speech rate, and harsh intonation.

In some examples, predefined emotional categories are categories defined by the CDRS and made available to the user for selection, such as joyful, sad, angry, calm, fearful, surprised, confident, disgusted, etc. Other implementations may utilize different, fewer, or additional emotional categories.

Report generation 118 facilitates the creation of a report detailing all modifications made to the video content. This includes information on replacement speech and emotional tone adjustments. Further, review and approval tools 120 provides a preview mode for reviewing the modified video. Users can approve or reject modifications and provide feedback or notes on specific fragments. Additionally, annotation tools are available to let the user provide feedback or notes on specific fragments.

Figure 2:
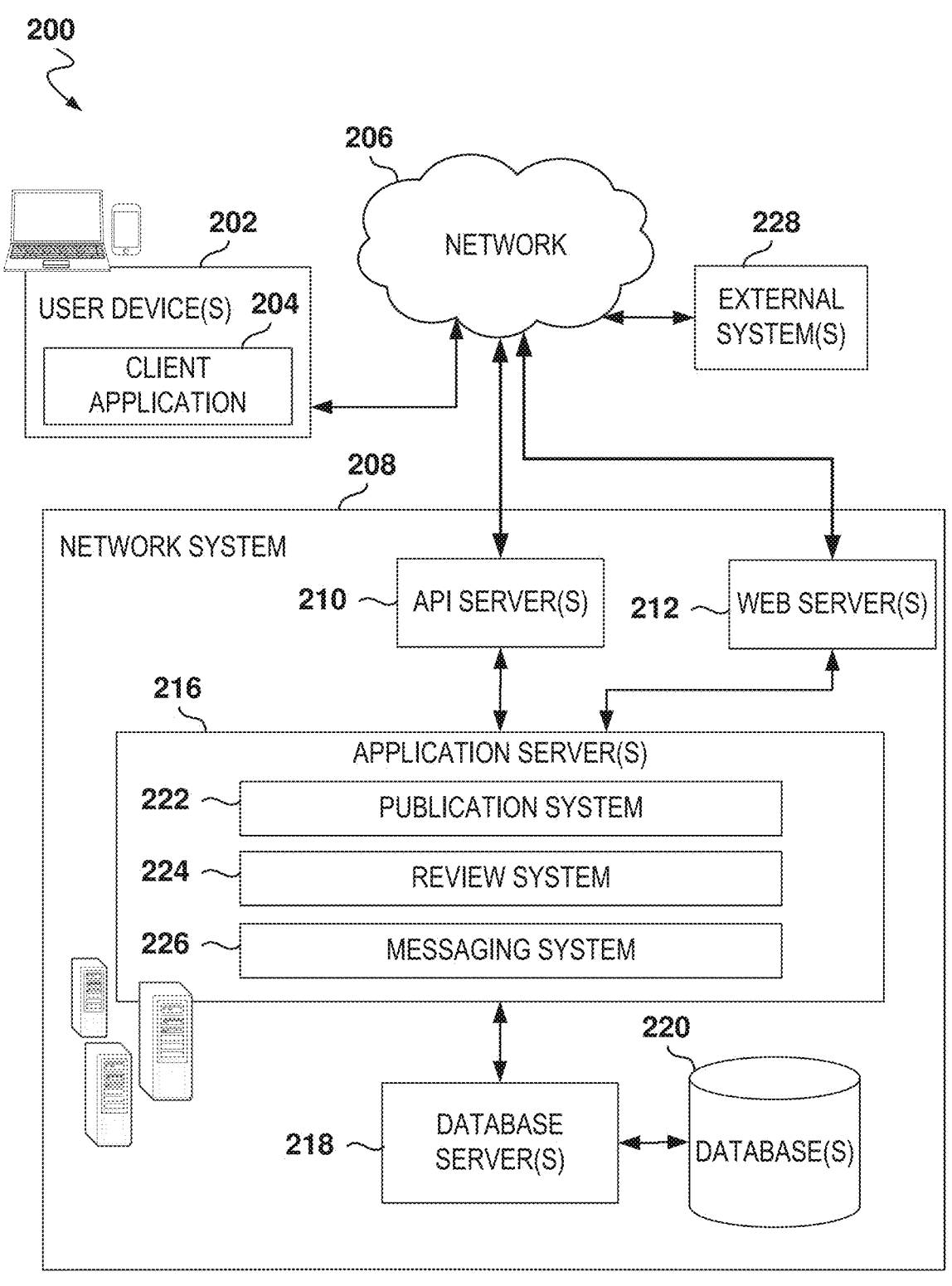
FIG. 2 is a block diagram showing an example network environment that includes a messaging system, according to some examples.

FIG. 2 is a block diagram showing an example network environment 200 that includes a messaging system 226, according to various examples of the present disclosure. As shown, the network environment 200 includes one or more user devices 202, a network system 208, and a network 206 (e.g., Internet, wide-area-network (WAN), local-area-network (LAN), wireless network) that communicatively couples them together. Each user device 202 can host a number of applications, including a client software application 204. The client software application 204 can communicate and exchange data with the network system 208 via a network 206.

A user device 202 may comprise, but is not limited to, a smartphone, tablet, laptop, multi-processor systems, micro-processor-based or programmable consumer electronics, game consoles, or any other communication device that can access the network system 208. Additionally, each user device 202 comprises a display component (not shown) to display information (e.g., in the form of user interfaces), as will be discussed in more detail below.

The network system 208 provides server-side functionality via the network 206 to the client software application 204. While certain functionality is described herein as being performed by the messaging system 226 on the server system 208, it will be appreciated that the location of certain functionality within the network system 208 is a design choice. For example, it may be technically preferable to initially deploy certain technology and functionality within the network system 208, but to later migrate this technology and functionality to the client software application 204.

The network system 208 supports various services and operations that are provided to the client software application 204 by a publication system 222, a review system 224, and the messaging system 226. Further details regarding the various services and operations provided by publication system 222, a review system 224, and the messaging system 226 are discussed below, but generally, these operations include: transmitting data from any one or more of the publication system 222, the review system 224, and the messaging system 226 to the client software application 204; receiving data from the client software application 204 at any one or more of the publication system 222, the review system 224, and the messaging system 226; and processing data generated by the client software application 204. Data exchanges within the network environment 200 may be invoked and controlled through operations of software component environments available via one or more endpoints or functions available via one or more user interfaces of the client software application 204, which may include web-based user interfaces provided by the server system 208 for presentation at the user device 202.

With respect to the network system 208, one or more application programming interface (API) servers 210 and one or more web servers 212 are coupled to and provide programmatic and web interfaces, respectively, to one or more application servers 216. The application server(s) 216 host various systems, including the publication system 222, the review system 224, and the messaging system 226, each of which comprises a plurality of components and each of which can be embodied as hardware, software, firmware, or any combination thereof. The application server(s) 216 are, in turn, coupled to one or more database servers 218 that facilitate access to one or more databases 220. The database (s) 220 may be stored in one or more storage devices and may, for example, include user accounts, including user profiles of users of the network system 208, and can also store chat histories between users utilizing the functionality of the messaging system 226.

The API server(s) 210 receives and transmits data (e.g., API calls, commands, requests, responses, and authentication data) between the user device(s) 202 and the application server 216. Specifically, the API server(s) 210 provides a set of interfaces (e.g., routines and protocols) that can be called or queried by the client software application 204 in order to invoke the functionality of the application server(s) 216. The API server(s) 210 expose various functions supported by the application server 216 including, without limitation, messaging, listing publication, and review of goods and services and sellers thereof.

The publication system 222 manages publications (e.g., articles, listings of available goods or services) and transactions (e.g., for goods and services) at the network system 208, including generating and publishing the publications, conducting searches for publications, and/or maintaining user accounts.

The review system 224 allows users to provide feedback on goods and services as well as the sellers of goods and services. Utilizing the review system 224, users can rate goods, services, and sellers thereof on various aspects such as quality, shipping speed, and customer service, providing a comprehensive evaluation. The review system 224 may aggregate and analyze review data to present summary statistics and trends to users.

The messaging system 226 facilitates electronic chat conversations between users by allowing them to exchange messages that include text, audio, images, and/or videos.

The environment 200 can also comprise one or more external systems 228. The external system(s) 228 can be a third-party system that performs data operations or processing for the network system 208. For example, the external system(s) 228 can comprise a large language model (LLM) or generative artificial intelligence (AI) system that processes data on behalf of the network system 208. The LLM is a trained model configured to generate text and perform natural language processing tasks such as classifying the intent of messages.

Any of the systems, data storage, or devices (collectively referred to as "components") shown in or associated with FIG. 2 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein.

Moreover, any two or more of the components illustrated in FIG. 2 may be combined, and the functions described herein for any single component may be subdivided among multiple components. Functionalities of one system may, in alternative examples, be embodied in a different system. For example, any of the functionalities discussed above with respect to the messaging system 226 may be embodied within the user device 202, the publication system 222, or the review system 224. While only a single network system 208 is shown, alternatively, more than one network system 208 can be included (e.g., localized to a particular region).

Figure 3:
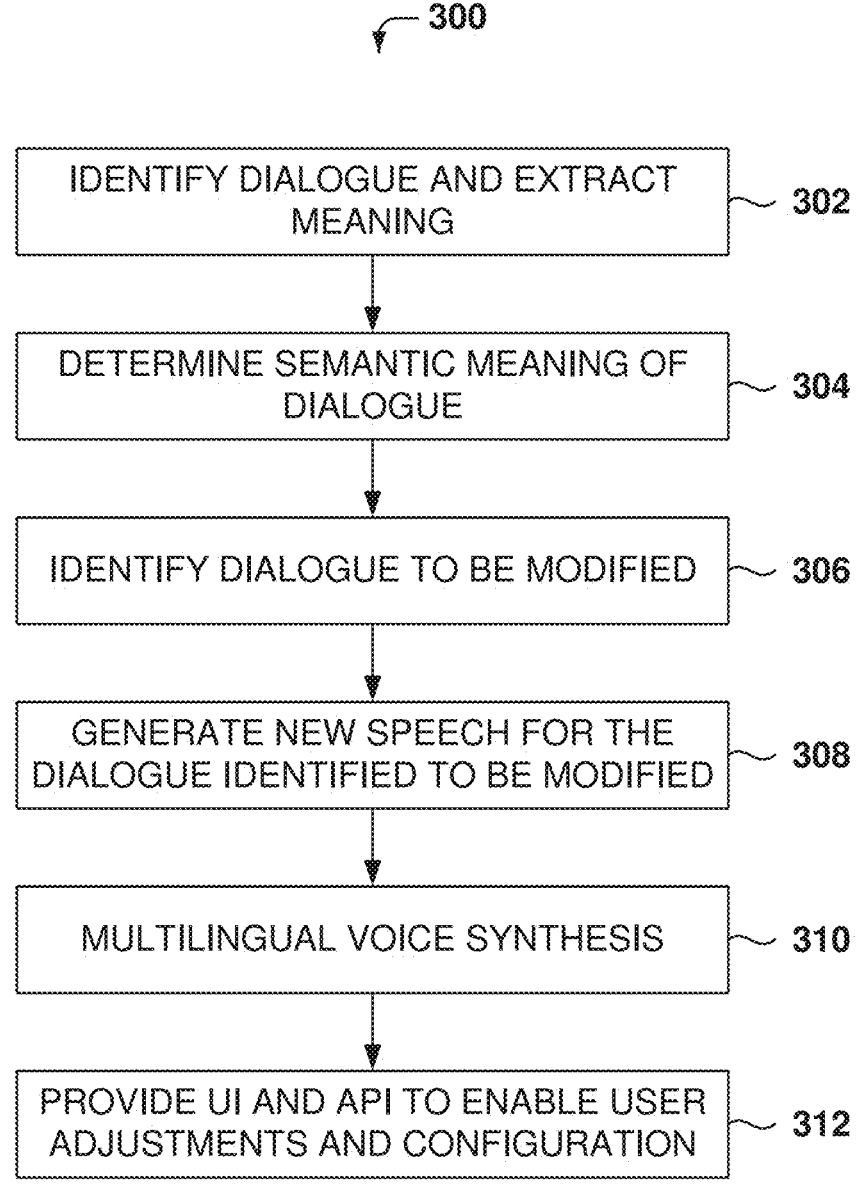
FIG. 3 is a flowchart of a method for contextual dialogue replacement, according to some examples.

FIG. 3 is a flowchart of a method 300 for contextual dialogue replacement, according to some examples. While the various operations in this flowchart are presented and described sequentially, one of ordinary skill will appreciate that some or all of the operations may be executed in a different order, be combined or omitted, or be executed in parallel.

At operation 302, dialogue is identified and meaning is extracted from the video content. One purpose is to break down the video into segments and identify spoken content. Automatic speech recognition (ASR) is used to transcribe spoken words into text for the given language being used.

In some examples, advanced machine learning models, such as convolutional neural networks (CNNs) and recurrent neural networks (RNNs), are used for temporal recognition of speech to analyze both visual and audio data.

The CNNs are used to identify visual cues in the video (e.g., facial expressions and lip movements). The RNNs track temporal dependencies to recognize when speech occurs within a scene. Also, LSTMs are used to retain long-term context over a scene's duration, making sure the dialogue matches the visual cues.

Further, a transformer model, e.g., BERT (Bidirectional Encoder Representations from Transformers), is used to analyze the text semantically to understand the meaning, context, and emotional tone of the dialogue.

The dialogue may be identified for modification based on cultural and regional sensitivities, such as language differences between countries (e.g., Spain and Latin America, US, and Great Britain), religious beliefs in different countries, age of target audience (e.g., convert dialogue to make it appropriate for all users of all ages). Also, dialogue may be modified if the content includes confidential information, top-secret information, private information, location information, political affiliations, etc.

In this context, the elements of emotional tone and dialogue become relevant. Through these elements, it becomes possible to determine the emotional state of an individual, such as whether the individual is upset in the scene or if the individual is happy.

The RNN identifies specific differences in speech based on each scene and segments the video into scenes. It retains long-term context, which can be maintained across any scene duration. The approach ensures that determination can be made regarding whether the dialogue is appropriate for the scene and whether it is coherent. Subsequently, an LLM may be used to assist with analyzing aspects related to the emotion, intent, and context of the dialogue.

The CDRS calculates the timestamp along with each frame within that timestamp at nearly millisecond intervals. The CDRS processes all that information, and for each timestamp, the CDRS determines whether the scene depicts a background or a scenario involving people talking. The metadata includes the timestamp and specifies the presence of a human. Furthermore, the CDRS can label and repeatedly identify certain humans it detects frequently.

In some examples, a report generated by report generation 118 includes these details, e.g., timestamps, background areas, people areas, events, character mapping, confidence level, etc.

The CDRS identifies the different characters, e.g., character A and character B, and subsequently assigns a mapping for each character based on the respective vocal characteristics. Each timestamp is associated with an indication of the emotion level. The extracted data operates similarly to a probability metric, providing a comparative level of certainty denoted by categories such as A, B, C, and D. Once an aggregated level of certainty is obtained, a score indicating a confidence level, e.g., 70% or 80%, can be assigned. The CDRS continuously maps each data point. Moreover, the CDRS has an adaptive learning capability, leading to a dataset that can be conceptualized as multiple nodes within a branching structure.

Subsequently, the speech pattern associated with the actor is available. Emotional context is also determined for each scene. The process deconstructs and organizes the data into discrete nodes. These nodes comprise arrays for every element. Therefore, with each analysis, the CDRS provides a prediction, and the CDRS determines the events occurring in each specific scene.

In some examples, if the CDRS detects a confidence level exceeding a predetermined threshold, e.g., 70%, it will store the data. The CDRS will register the corresponding state (e.g., anger) of the subject. Subsequently, anger models will be utilized. This information will later be employed to modify certain facial features and similar attributes.

The data may be analyzed by frame or by a group of frames. For example, an individual is angry between a beginning frame and an ending frame within the video. The CDRS is configurable for breaking the analysis of the video into time segments of configurable duration (e.g., five seconds, one minute).

The RNN is used for analyzing text, working similarly to an OCR system processing text, segmenting the input into components, and performing matching operations. This involves aligning verbal tones with corresponding words. Consequently, when text appears on the screen, the alignment with the audio is known.

In some examples, the data is embedded into vectors to be processed by the different models. In some variables, the data is assigned to a category, e.g., emotional state, and a plurality of categories are predefined. The model will then categorize the data to assign a value (e.g., an integer value) that corresponds to the identified category. Other categories include facial expressions (e.g., 100 different categories of face expressions) and lip movements (e.g., 25 different categories).

From operation 302, the method 300 flows to operation 304 to determine the semantic meaning of the dialogue. In some examples, semantic parsing is used to extract meaning, context, and tone from the dialogue. During operation 304, the information about visual cues and fragments is used to analyze each fragment to determine the semantic meaning of the dialogue.

In some examples, transformer models, such as GPT-3 or T5, are used to generate and evaluate semantic meaning in the speech, which will be used to identify dialogues that require adaptation.

From operation 304, the method 300 flows to operation 306, which involves identifying the dialogue to be modified. The aim is to decide which dialogues need to be modified based on factors such as regional differences, cultural sensitivity, or inappropriate content (e.g., for audiences that include children). The sentiment-analysis and emotion-detection algorithms identify the emotional tone of the speech.

In some examples, identifying the particular dialog includes determining the group of frames with a particular emotional tone, frames with a particular facial expression category, frames with a particular lip movement, frames with a certain emotional category, frames associated with a particular event, etc.

One example of regional differences and cultural sensitivity that might necessitate dialogue replacement in videos is for a thing that has a typically different name on different countries, for example the British English terms like "lift" or "lorry" may need to be adapted for an American audience, replacing these with "elevator" and "truck" respectively. Another example is for idiomatic expressions that are particular to one country, such as replacing the Australian expression "She'll be right, mate" to something like "It'll be fine, buddy" for a North American audience to better understand the meaning.

Another example of regional differences may be the replacement of some items that only exist in one country, such as educational levels. This way, a reference to "A-levels" in a British educational context will be replaced with "SATs" or "AP exams" for an U.S. audience.

Some examples of cultural sensitivity may refer to religious references, gestures and body language, and historical or political references. Examples include replacing a casual reference to eating beef in content intended for regions with large Hindu populations, where cows are considered sacred. Also, a character giving a "thumbs up" gesture might need to be modified for audiences in some middle eastern countries, where this can be considered offensive. In yet another example, a joke or casual reference about certain historical events might need to be replaced or removed when the content is distributed in countries where such topics are sensitive or controversial.

In some examples, the system employs a sequence-to-sequence (Seq2Seq) model to learn the relationships between different segments of the dialogue. A multi-label classification approach categorizes dialogues based on tone, subject matter, and intended audience.

Then, each sequence or fragment is analyzed to determine if the categories associated with the segment meet one or more rules that determine if the sequence needs to be modified. For example, one rule may be the detection of obscene language. If the category of obscene language is detected in the sequence, then the sequence is identified for modification.

Other rules may be based on modifying for regional differences or cultural differences in order to match the dialogue to the targeted audience.

From operation 306, the method 300 flows to operation 308, where new speech is generated for the dialogue identified to be modified. Once dialogues are identified for modification, the CDRS generates new speech using TTS technology, such as WaveNet or FastSpeech 2. The TTS model generates the speech, which is then modified to match the original actor's voice profile using neural voice cloning.

The new speech is synchronized with the video using techniques like dynamic time warping (DTW) to ensure the timing of the speech aligns with the lip movements. DTW is an algorithm used to measure the similarity between two temporal sequences, even if they are not perfectly aligned in time. This technique is particularly valuable when the sequences exhibit temporal distortions or vary in speed. DTW provides temporal flexibility by non-linearly warping the time axis, allowing segments of one sequence to be stretched or compressed so that they align optimally with segments of another sequence. DTW computes a cost matrix where each element represents the distance between points in the two sequences. This matrix forms the basis for determining the best alignment. Further, DTW employs dynamic programming to identify the path through the cost matrix that minimizes the cumulative distance. This path, known as the warping path, defines the optimal alignment between the sequences.

DTW provides an effective solution for aligning time-dependent data that may be subject to irregularities or asynchronous behavior. By constructing a cost matrix and leveraging dynamic programming techniques, DTW identifies an optimal alignment that minimizes the overall distance between sequences. This makes it a viable tool for pattern recognition tasks where the temporal ordering and local distortions must be taken into account.

In some examples, the CDRS uses HiFi-GAN for high-quality, real-time voice synthesis, and neural voice cloning ensures the new voice matches the original actor's voice profile. Further, lip-syncing algorithms adjust the video to ensure the new dialogue matches the actor's lip movements in the video.

HiFi-GAN is a neural vocoder that leverages a generative adversarial network (GAN) framework to synthesize high-fidelity audio waveforms from mel-spectrogram inputs. The architecture is designed for efficient and high-quality audio generation, combining advanced upsampling strategies with adversarial training. The generator transforms mel-spectrogram representations into raw audio, constructed using a series of transposed convolutional layers to upsample the low-dimensional spectrogram input, interleaved with residual blocks that employ dilated convolutions. This design helps capture both local fine-grained details and long-range temporal dependencies in the audio signal.

In some examples, the HiFi-GAN model is trained using a combination of loss functions: Adversarial Loss, which encourages the generator to produce waveforms that are indistinguishable from real audio by fooling the discriminators; feature matching loss to minimize the differences between the internal activations (features) of real and generated audio across the discriminators, which stabilizes training and improves audio quality; and reconstruction loss to ensure that the generated audio closely matches the target mel-spectrogram representation, promoting fidelity in the synthesized waveform.

The HiFi-GAN is employed for real-time voice synthesis and neural voice cloning. This application involves generating new voice patterns for each actor. The system includes both the original voice actor and the newly generated voice and subsequently aligns the voices to achieve a high degree of similarity, potentially reaching close to 100% accuracy in matching actors with speech.

The result is lip-movement synchronization. For instance, a film in English has been dubbed into Spanish where the lip-syncing is evidently misaligned. The HiFi-GAN adjustment modifies the video to ensure the updated dialogue approximately corresponds with the lip movement for a more natural match of speech and video.

Further, in one scenario, there exists a problem with video content or older material, necessitating the generation of new speech or accommodating regional restrictions. For instance, certain dialogues may not be permissible in regions such as China, thereby requiring the editing of particular scenes. Traditionally, the film industry addresses such challenges by conducting reshoots or filming additional scenes. However, with the presented techniques, the modification of content can be performed during post-production with a significant reduction in cost.

From operation 308, the method 300 flows to operation 310, which involves multilingual voice synthesis. This is an optional operation that can be performed when translation is requested. This operation incorporates the previous model's calculated emotional tone and uses a voice profile that functions bilingually, e.g., English, Japanese, Spanish, Chinese, etc.

The CDRS translates the dialogue into other languages while maintaining the emotional tone and voice profile of the original actor and adjusting the speech to match the lip movement.

In some examples, the process uses multilingual neural networks, e.g., MarianMT for translation and FastSpeech 2 for voice synthesis.

The translated text is then input into a TTS model that generates speech in the new language while maintaining the original actor's emotional tone and cadence. In some examples, the CDRS utilizes multi-task learning to train a unified model capable of performing both translation and synthesis in one pass.

From operation 310, the method 300 proceeds to operation 312, where a user interface (UI) and an application programming interface (API) are provided to enable user adjustments and configuration. For example, see the options for the UI described above in reference to FIG. 1.

Users can modify parameters like voice selection, subtitle content, and regional adaptations, and the CDRS system employs serverless computing to handle adjustments without increasing latency. The API interface allows users to control the features programmatically and integrate the CDRS with other systems.

The cloud-based orchestration ensures smooth operation across different regions, minimizing latency and maintaining scalability during real-time usage. In some examples, the CDRS leverages serverless computing (e.g., AWS Lambda) to allocate computing resources dynamically based on the demand for real-time modifications.

A user interface (UI) is provided to display the final suggestions for dialogue replacement. Real-time adjustments are possible, enabling modifications such as altering the emotion, e.g., to make it more angry, if needed. The same voice model will be employed to execute these adjustments.

An API will also be implemented in the back end to facilitate configuration and modifications via programmatic access.

It noted that the dialogue-replacement process described above might be performed offline, e.g., to analyze a movie, or in real-time to alter dialogue replacement for life segments, such as TV broadcasts.

Figure 4:
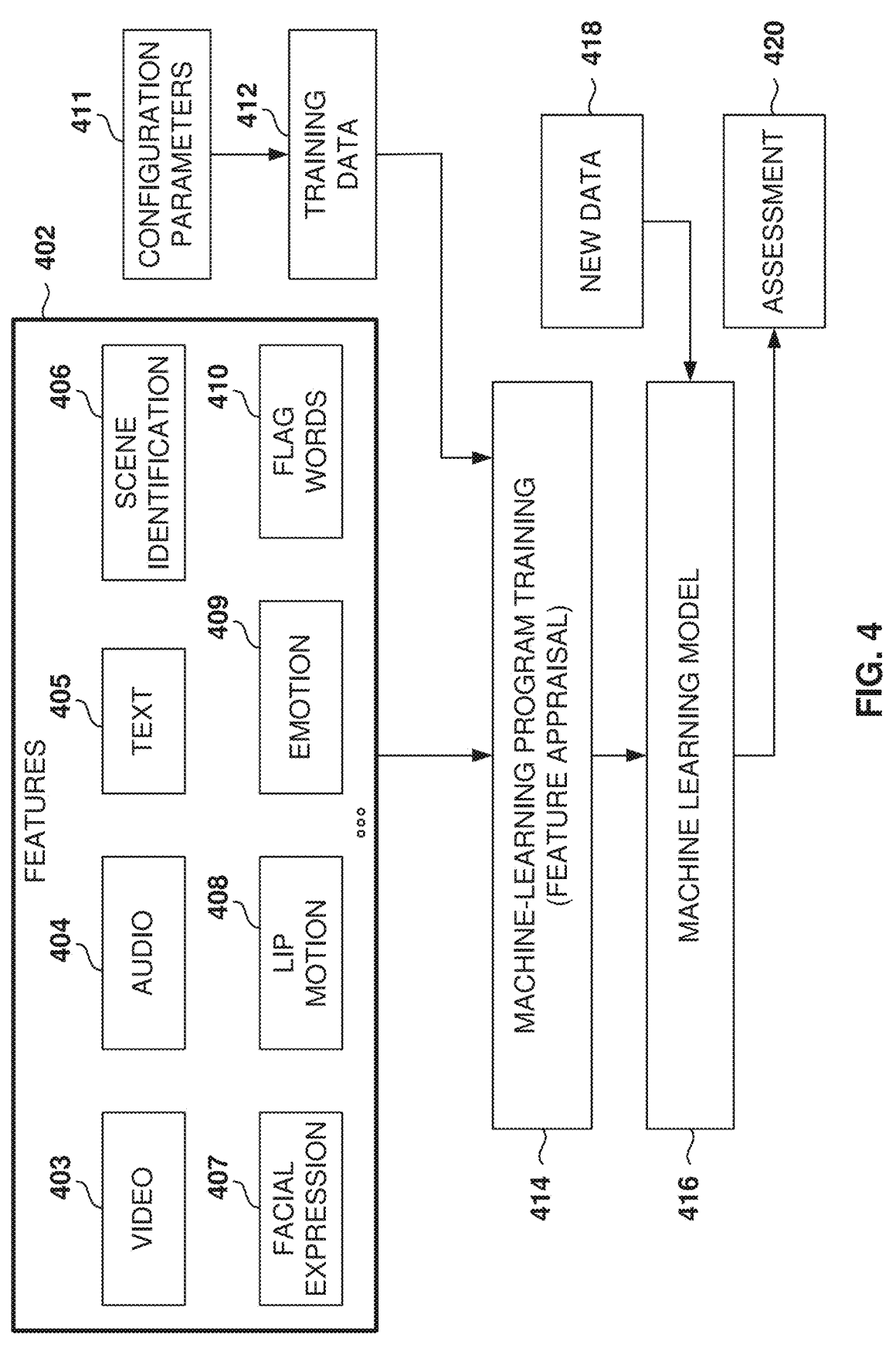
FIG. 4 illustrates the training and use of a machine-learning model, according to some example examples.

FIG. 4 illustrates the training and use of a machine-learning model 416, according to some example examples. In some examples, machine learning (ML) models 416 are utilized to perform operations associated with processing video and the speech embedded in the video.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 416 from training data 412 in order to make data-driven predictions or decisions expressed as outputs or assessments 420. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

As described above with reference to FIG. 3, different models may be used at different stages of the dialogue-replacement process.

The training data 412 comprises examples of values for the features 402. In some examples, the training data comprises labeled data with examples of values for the features 402 and labels indicating the outcome, such as emotion detected, text corresponding to speech, lip-synching information, etc. The machine-learning algorithms utilize the training data 412 to find correlations among identified features 402 that affect the outcome. A feature 402 is an individual measurable property of a phenomenon being observed. The concept of a feature is related to that of an explanatory variable used in statistical techniques such as linear regression. Choosing informative, discriminating, and independent features is beneficial for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

In one example, the features 402 may be of different types and may include one or more of video data 403, audio data 404, text 405, scene identification 406, facial expression 407, lip motion 408, emotional category 409, flagged words 410 (which will trigger dialogue replacement, such as obscene words). The ML models may use one or more of the features 402, and these features may also be associated with the input or outputs of the ML models.

During training 414, the ML program, also referred to as ML algorithm or ML tool, analyzes the training data 412 based on identified features 402 and configuration parameters 411 defined for the training. The result of the training 414 is the ML model 416, which is capable of taking inputs to produce assessments.

Training an ML algorithm involves analyzing large amounts of data (e.g., from several gigabytes to a terabyte or more) in order to find data correlations. The ML algorithms utilize the training data 412 to find correlations among the identified features 402 that affect the outcome or assessment 420. In some examples, the training data 412 includes labeled data, which is known data for one or more identified features 402 and one or more outcomes, such as emotion in a fragment, speaker identification, emotion category, language detection, etc.

Many ML algorithms include configuration parameters 411, and the more complex the ML algorithm, the more parameters there are that are available to the user. The configuration parameters 411 define variables for an ML algorithm in the search for the best ML model. The training parameters include model parameters and hyperparameters. Model parameters are learned from the training data, whereas hyperparameters are not learned from the training data but are instead provided to the ML algorithm.

When the ML model 416 is used to perform an assessment, new data 418 is provided as input to the ML model 416, and the ML model 416 generates the assessment 420 as output. For example, when a video is analyzed, the video may be broken into scenes, and when a scene is analyzed, the ML model may determine the emotion in the speech of the text of the speech, etc.

In some examples, results obtained by the model 416 during operation (e.g., assessment 420 produced by the model in response to inputs) are used to improve the training data 412, which is then used to generate a newer version of the model. Thus, a feedback loop is formed to use the results obtained by the model to improve the model.

A neural network, sometimes referred to as an artificial neural network, is a computing system based on the consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons, can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network that is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplifies or dampen that input, which assigns significance to inputs for the task the algorithm is trying to learn. These input-weight products are summed, and the sum is passed through what is called a node's activation function to determine whether and to what extent that signal progresses further through the network to affect the outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that filter the results of the inputs and are used by the next convolution layer.

FIG. 5 is a flowchart of a method 500 for replacing dialogue in a video segment based on configurable parameters, according to some examples. While the various operations in this flowchart are presented and described sequentially, one of ordinary skill will appreciate that some or all of the operations may be executed in a different order, be combined or omitted, or be executed in parallel.

At operation 502, the content of a video is analyzed to extract dialogue and meaning in the video. In some examples, operation 502 involves using advanced machine learning models, such as convolutional neural networks (CNNs) and recurrent neural networks (RNNs), to analyze both visual and audio data. The purpose is to break down the video into segments and identify spoken content using automatic speech recognition (ASR). Semantic parsing is employed to extract meaning, context, and tone from the dialogue.

From operation 502, the method 500 flows to operation 504, where one or more fragments of the video are determined to be modified based on the extracted dialogue and meaning. The modification is based on factors such as regional differences, cultural sensitivity, and inappropriate content. In some examples, operation 502 involves applying natural language processing (NLP) models, such as BERT (Bidirectional Encoder Representations from Transformers), to understand the semantic context of the dialogue. The CDRS uses sentiment analysis and emotion detection techniques to evaluate the dialogue's appropriateness and the potential need for modification based on cultural or regional sensitivities.

After operation 504, operations 506 and 508 are performed for each fragment to be modified. At operation 506, replacement speech for each fragment identified to be modified is generated. In some examples, operation 506 uses transformer models, such as GPT-3 or T5, to generate and evaluate semantic meaning, identifying dialogues that require adaptation. The CDRS employs a sequence-to-sequence (Seq2Seq) model to learn context from dialogues and a multi-label classification approach to categorize speech for localization or alteration based on tone, subject matter, and audience.

From operation 506, the method 500 flows to operation 508, where audio is generated for the replacement speech. In some examples, operation 508 includes integrating real-time speech synthesis technologies, such as WaveNet or Fast-Speech 2, to dynamically generate speech that replaces the original dialogue. The CDRS uses dynamic time warping (DTW) and phase vocoder-based techniques to synchronize the new speech with lip movements, ensuring minimal latency and high similarity to the original voice. The synchronization maintains the emotional tone and voice profile of each speaker.

The voice profile is a set of characteristics that define a speaker's unique vocal attributes, including pitch, tone, and cadence, used to generate replacement speech that closely matches the original speaker.

In some examples, identifying and aligning lip movements with the voice profile and emotional tone utilizes a combination of techniques, including: visual analysis (e.g., using Convolutional Neural Networks (CNNs) to analyze visual cues in the video, including facial expressions and lip movements), audio analysis (e.g., using Recurrent Neural Networks (RNNs) and Long Short-Term Memory (LSTM) networks to analyze speech patterns and temporal dependencies in the audio), synchronization (e.g., using DTW to align the new audio with the existing lip movements), voice profile matching (e.g., using neural voice cloning techniques to replicate the unique vocal attributes of the original speaker, including pitch, tone, and cadence), emotional tone preservation (e.g., using sentiment analysis and emotion detection techniques to identify the emotional tone of the original dialogue), lip-syncing algorithms (e.g., using lip-syncing algorithms to adjust the movement of lips in the video to match the timing and phonetics of the newly generated speech), facial recognition (e.g., using uses facial recognition to ensure alignment with facial expressions, further enhancing the naturalness of the lip synchronization), and multi-task learning (e.g., using multi-task learning to train a universal speech synthesis model that can perform both translation and voice synthesis, maintaining consistency across languages).

After the last fragment is processed, the method 500 proceeds to operation 510, where the modified video with the new dialogue is presented on a computer display.

Another general aspect is for a system that includes a memory comprising instructions and one or more computer processors. The instructions, when executed by the one or more computer processors, cause the one or more computer processors to perform operations comprising: analyzing content of a video to extract dialogue and meaning in the video; determining one or more fragments of the video to be modified based on the extracted dialogue and the meaning in the video, the modification being based on one or more factors comprising regional differences, cultural sensitivity, and inappropriate content; for each fragment to be modified, perform operations comprising: generating replacement speech based on the one or more of regional differences, cultural sensitivity, and inappropriate content; and generating audio for the replacement speech, wherein generating the audio comprises synchronizing the audio with the video to align audio with lip movements while maintaining an emotional tone and a voice profile of each speaker in the video; and causing presentation on a computer display of the video with the modified one or more fragments.

In yet another general aspect, a tangible machine-readable storage medium (e.g., a non-transitory storage medium) includes instructions that, when executed by a machine, cause the machine to perform operations comprising: analyzing content of a video to extract dialogue and meaning in the video; determining one or more fragments of the video to be modified based on the extracted dialogue and the meaning in the video, the modification being based on one or more factors comprising regional differences, cultural sensitivity, and inappropriate content; for each fragment to be modified, perform operations comprising: generating replacement speech based on the one or more of regional differences, cultural sensitivity, and inappropriate content; and generating audio for the replacement speech, wherein generating the audio comprises synchronizing the audio with the video to align audio with lip movements while maintaining an emotional tone and a voice profile of each speaker in the video; and causing presentation on a computer display of the video with the modified one or more fragments.

In view of the disclosure above, various examples are set forth below. It should be noted that one or more features of an example, taken in isolation or combination, should be considered within the disclosure of this application.

Example 1. A computer-implemented method, comprising: analyzing content of a video to extract dialogue and meaning in the video; determining one or more fragments of the video to be modified based on the extracted dialogue and the meaning in the video, the modification being based on one or more factors comprising regional differences, cultural sensitivity, and inappropriate content; for each fragment to be modified, perform operations comprising: generating replacement speech based on the one or more of regional differences, cultural sensitivity, and inappropriate content; and generating audio for the replacement speech, wherein generating the audio comprises synchronizing the audio with the video to align audio with lip movements while maintaining an emotional tone and a voice profile of each speaker in the video; and causing presentation on a computer display of the video with the modified one or more fragments.

Example 2. The method of Example 1, further comprising: utilizing a multilingual neural network to generate replacement speech for a different language while maintaining the emotional tone and the voice profile of an original speaker.

Example 3. The method of any one or more of Examples 1-2, further comprising: providing a user interface with options for configuring the one or more factors for modifying the video, adjusting the modified video, and approving the modified video for presentation.

Example 4. The method of any one or more of Examples 1-3, wherein analyzing the content further comprises: determining an emotional tone in the video.

Example 5. The method of any one or more of Examples 1-4, further comprising: categorizing the emotional tone into one of a plurality of predefined emotional categories, wherein each emotional category corresponds to a respective emotional state.

Example 6. The method of any one or more of Examples 1-5, wherein the synchronization of the replacement speech comprises: using facial recognition to ensure alignment with facial expressions.

Example 7. The method of any one or more of Examples 1-6, further comprising: generating a report detailing modifications made to the content of the video, including details of the replacement speech and emotional tone.

Example 8. The method of any one or more of Examples 1-7, further comprising: utilizing a machine learning model to identify cultural sensitivities in the dialogue.

Example 9. The method of any one or more of Examples 1-8, further comprising: applying sentiment analysis to determine the emotional tone of the dialogue.

Example 10. The method of any one or more of Examples 1-9, wherein the replacement speech is synchronized with the video using dynamic time warping (DTW) to align with lip movements.

Example 11. The method of any one or more of Examples 1-10, further comprising storing metadata associated with each modified fragment, including timestamps and speaker identification.

Example 12. A system comprising: a memory comprising instructions; and one or more computer processors, the instructions, when executed by the one or more computer processors, causing the system to perform operations comprising: analyzing content of a video to extract dialogue and meaning in the video; determining one or more fragments of the video to be modified based on the extracted dialogue and the meaning in the video, the modification being based on one or more factors comprising regional differences, cultural sensitivity, and inappropriate content; for each fragment to be modified, perform operations comprising: generating replacement speech based on the one or more of regional differences, cultural sensitivity, and inappropriate content; and generating audio for the replacement speech, wherein generating the audio comprises synchronizing the audio with the video to align audio with lip movements while maintaining an emotional tone and a voice profile of each speaker in the video; and causing presentation on a computer display of the video with the modified one or more fragments.

Example 13. The system of any Example 12, wherein the instructions further cause the one or more computer processors to perform operations comprising: utilizing a multilingual neural network to generate replacement speech for a different language while maintaining the emotional tone and the voice profile of an original speaker.

Example 14. The system of any one or more of Examples 12-13, wherein the instructions further cause the one or more computer processors to perform operations comprising: providing a user interface with options for configuring the one or more factors for modifying the video, adjusting the modified video, and approving the modified video for presentation.

Example 15. The system of any one or more of Examples 12-14, wherein analyzing the content further comprises: determining an emotional tone in the video.

Example 16. The system of any one or more of Examples 12-15, wherein the instructions further cause the one or more computer processors to perform operations comprising: categorizing the emotional tone into one of a plurality of predefined emotional categories, wherein each emotional category corresponds to a respective emotional state.

Example 17. A non-transitory machine-readable storage medium including instructions that, when executed by a machine, cause the machine to perform operations comprising: analyzing content of a video to extract dialogue and meaning in the video; determining one or more fragments of the video to be modified based on the extracted dialogue and the meaning in the video, the modification being based on one or more factors comprising regional differences, cultural sensitivity, and inappropriate content; for each fragment to be modified, perform operations comprising: generating replacement speech based on the one or more of regional differences, cultural sensitivity, and inappropriate content; and generating audio for the replacement speech, wherein generating the audio comprises synchronizing the audio with the video to align audio with lip movements while maintaining an emotional tone and a voice profile of each speaker in the video; and causing presentation on a computer display of the video with the modified one or more fragments.

Example 18. The non-transitory machine-readable storage medium of Examples 17, wherein the machine further performs operations comprising: utilizing a multilingual neural network to generate replacement speech for a different language while maintaining the emotional tone and the voice profile of an original speaker.

Example 19. The non-transitory machine-readable storage medium of any one or more of Examples 17-18, wherein the machine further performs operations comprising: providing a user interface with options for configuring the one or more factors for modifying the video, adjusting the modified video, and approving the modified video for presentation.

Example 20. The non-transitory machine-readable storage medium of any one or more of Examples 17-19, wherein analyzing the content further comprises: determining an emotional tone in the video.

Figure 6:
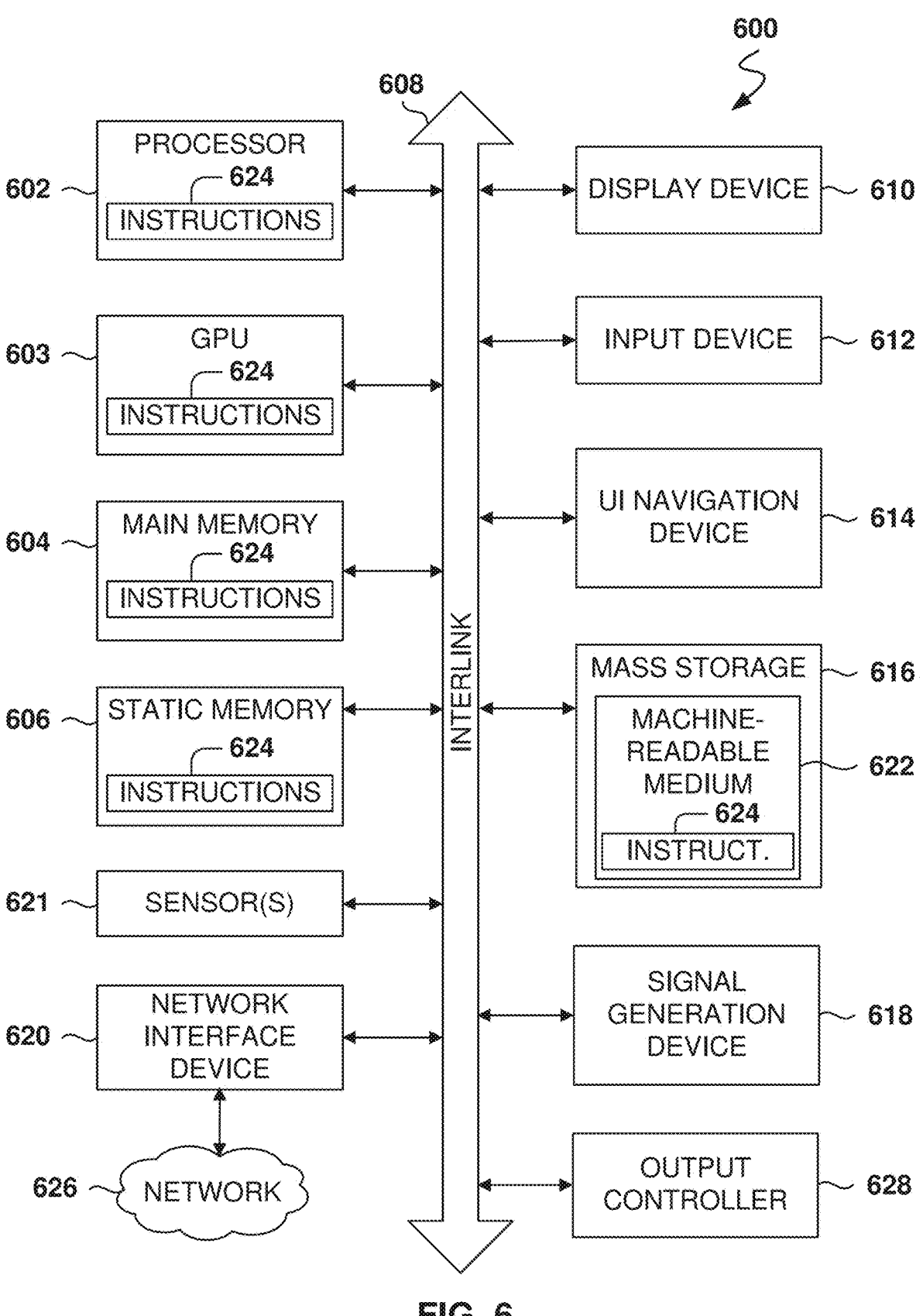
FIG. 6 is a block diagram illustrating an example of a machine upon or by which one or more process examples described herein may be implemented or controlled.

FIG. 6 is a block diagram illustrating an example of a machine 600 upon or by which one or more process examples described herein may be implemented or controlled. In alternative examples, the machine 600 may operate as a standalone device or be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. Further, while only a single machine 600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as recited herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 600 (e.g., computer system) may include a hardware processor 602 (e.g., a central processing unit (CPU), a hardware processor core, or any combination thereof), a graphics processing unit (GPU 603), a main memory 604, and a static memory 606, some or all of which may communicate with each other via an interlink 608 (e.g., bus). The machine 600 may further include a display device 610, an alphanumeric input device 612 (e.g., a keyboard), and a user interface (UI) navigation device 614 (e.g., a mouse). In an example, the display device 610, alphanumeric input device 612, and UI navigation device 614 may be a touch screen display. The machine 600 may additionally include a mass storage device 616 (e.g., drive unit), a signal generation device 618 (e.g., a speaker), a network interface device 620, and one or more sensors 621, such as a Global Positioning System (GPS) sensor, compass, accelerometer, or another sensor. The machine 600 may include an output controller 628, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 602 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 602 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 602 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 602 may be emulated in software, running on a physical processor, as a virtual processor or virtual circuit. The virtual processor may behave like an independent processor but is implemented in software rather than hardware.

The mass storage device 616 may include a machine-readable medium 622 on which one or more sets of data structures or instructions 624 (e.g., software) embodying or utilized by any of the techniques or functions described herein. The instructions 624 may also reside, completely or at least partially, within the main memory 604, within the static memory 606, within the hardware processor 602, or the GPU 603 during execution thereof by the machine 600. For example, one or any combination of the hardware processor 602, the GPU 603, the main memory 604, the static memory 606, or the mass storage device 616 may constitute machine-readable media.

While the machine-readable medium 622 is illustrated as a single medium, the term "machine-readable medium" may include a single medium or multiple media (e.g., a centralized or distributed database and associated caches and servers) configured to store one or more instructions 624.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 624 for execution by the machine 600 and that causes the machine 600 to perform any one or more of the techniques of the present disclosure or that is capable of storing, encoding, or carrying data structures used by or associated with such instructions 624. Non-limiting machine-readable medium examples may include solid-state memories and optical and magnetic media. For example, a massed machine-readable medium comprises a machine-readable medium 622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium"

mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 624 may be transmitted or received over a communications network 626 using a transmission medium via the network interface device 620. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 624 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method, comprising:
analyzing content of a video to extract dialogue and meaning in the video;
determining one or more fragments of the video to be modified based on the extracted dialogue and the meaning in the video, the modification being based on one or more factors comprising regional differences, cultural sensitivity, and inappropriate content;
for each fragment to be modified, perform operations comprising:
generating replacement speech based on the one or more of regional differences, cultural sensitivity, and inappropriate content; and
generating audio for the replacement speech, the generating of the audio comprising synchronizing the audio with the video to align audio with lip movements while maintaining an emotional tone and a voice profile of each speaker in the video; and
causing presentation on a computer display of the video with the modified one or more fragments.

2. The method as recited in claim 1, further comprising:
utilizing a multilingual neural network to generate replacement speech for a different language while maintaining the emotional tone and the voice profile of an original speaker.

3. The method as recited in claim 1, further comprising:
providing a user interface with options for configuring the one or more factors for modifying the video, adjusting the modified video, and approving the modified video for presentation.

4. The method as recited in claim 1, wherein analyzing content further comprises:
determining an emotional tone in the video.

5. The method as recited in claim 4, further comprising:
categorizing the emotional tone into one of a plurality of predefined emotional categories, wherein each emotional category corresponds to a respective emotional state.

6. The method as recited in claim 1, wherein the synchronization of the replacement speech comprises:
using facial recognition to ensure alignment with facial expressions.

7. The method as recited in claim 1, further comprising:
generating a report detailing modifications made to the content of the video, the report comprising details of the replacement speech and emotional tone.

8. The method as recited in claim 1, further comprising:
utilizing a machine learning model to identify cultural sensitivities in the dialogue.

9. The method as recited in claim 1, further comprising:
applying sentiment analysis to determine the emotional tone of the dialogue.

10. The method as recited in claim 1, wherein the replacement speech is synchronized with the video using dynamic time warping (DTW) to align with lip movements.

11. The method as recited in claim 1, further comprising:
storing metadata associated with each modified fragment, the metadata comprising timestamps and speaker identification.

12. A system comprising:
a memory comprising instructions; and
one or more computer processors, the instructions, when executed by the one or more computer processors, causing the system to perform operations comprising:
analyzing content of a video to extract dialogue and meaning in the video;
determining one or more fragments of the video to be modified based on the extracted dialogue and the meaning in the video, the modification being based on one or more factors comprising regional differences, cultural sensitivity, and inappropriate content;
for each fragment to be modified, perform operations comprising:
generating replacement speech based on the one or more of regional differences, cultural sensitivity, and inappropriate content; and
generating audio for the replacement speech, the generating of the audio comprising synchronizing the audio with the video to align audio with lip movements while maintaining an emotional tone and a voice profile of each speaker in the video; and
causing presentation on a computer display of the video with the modified one or more fragments.

13. The system as recited in claim 12, wherein the instructions further cause the one or more computer processors to perform operations comprising:
utilizing a multilingual neural network to generate replacement speech for a different language while maintaining the emotional tone and the voice profile of an original speaker.

14. The system as recited in claim 12, wherein the instructions further cause the one or more computer processors to perform operations comprising:
providing a user interface with options for configuring the one or more factors for modifying the video, adjusting the modified video, and approving the modified video for presentation.

15. The system as recited in claim 12, wherein analyzing the content further comprises:
determining an emotional tone in the video.

16. The system as recited in claim 12, wherein the instructions further cause the one or more computer processors to perform operations comprising:
categorizing the emotional tone into one of a plurality of predefined emotional categories, wherein each emotional category corresponds to a respective emotional state.

17. A machine-storage medium comprising instructions that, when executed by a machine, cause the machine to perform operations comprising:

analyzing content of a video to extract dialogue and meaning in the video;

determining one or more fragments of the video to be modified based on the extracted dialogue and the meaning in the video, the modification being based on one or more factors comprising regional differences, cultural sensitivity, and inappropriate content;

for each fragment to be modified, perform operations comprising:

generating replacement speech based on the one or more of regional differences, cultural sensitivity, and inappropriate content; and generating audio for the replacement speech, the generating of the audio comprising synchronizing the audio with the video to align audio with lip movements while maintaining an emotional tone and a voice profile of each speaker in the video; and causing presentation on a computer display of the video with the modified one or more fragments.

18. The machine-storage medium as recited in claim 17, wherein the machine further performs operations comprising:

utilizing a multilingual neural network to generate replacement speech for a different language while maintaining the emotional tone and the voice profile of an original speaker.

19. The machine-storage medium as recited in claim 17, wherein the machine further performs operations comprising:

providing a user interface with options for configuring the one or more factors for modifying the video, adjusting the modified video, and approving the modified video for presentation.

20. The machine-storage medium as recited in claim 17, wherein analyzing the content further comprises:

determining an emotional tone in the video.

\* \* \* \* \*